United States Patent
Singh et al.

(10) Patent No.: US 10,595,252 B2
(45) Date of Patent: Mar. 17, 2020

(54) METHOD AND SYSTEM TO SUPPORT SEAMLESS WI-FI TO CELLULAR HANDOFF ON POWER CONSTRAINED DEVICE

(71) Applicant: Apple Inc., Cupertino, CA (US)

(72) Inventors: Ajoy K. Singh, Milpitas, CA (US); Najeeb M. Abdulrahiman, Fremont, CA (US); Sergey Sitnikov, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/996,229

(22) Filed: Jun. 1, 2018

(65) Prior Publication Data

US 2019/0373525 A1    Dec. 5, 2019

(51) Int. Cl.
*H04W 36/14*   (2009.01)
*H04W 36/18*   (2009.01)
*H04W 36/30*   (2009.01)
*H04W 60/04*   (2009.01)
*H04W 36/36*   (2009.01)
*H04W 88/06*   (2009.01)

(52) U.S. Cl.
CPC ........... *H04W 36/14* (2013.01); *H04W 36/18* (2013.01); *H04W 36/30* (2013.01); *H04W 36/36* (2013.01); *H04W 60/04* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 7,310,527 B2 | 12/2007 | Jagadeesan | |
| 7,574,212 B2 | 8/2009 | McConnell | |
| 8,045,493 B2 | 10/2011 | Gallagher | |
| 8,923,852 B2 | 12/2014 | Sengupta | |
| 2006/0239277 A1 | 10/2006 | Gallagher | |
| 2008/0102843 A1* | 5/2008 | Todd | H04W 36/18 455/445 |

(Continued)

FOREIGN PATENT DOCUMENTS

WO    WO2009058748 A1    5/2009

*Primary Examiner* — Chirag G Shah
*Assistant Examiner* — Srinivasa R Reddivalam
(74) *Attorney, Agent, or Firm* — Kowert Hood Munyon Rankin and Goetzel PC; Jeffrey C. Hood; Matthew C. Washburn

(57) ABSTRACT

Methods and systems are disclosed for performing seamless voice call handover and data handoff between a cellular network and a non-cellular (e.g., Wi-Fi) network, by a link budget limited user equipment device (UE) in standalone mode. The cellular radio may be maintained in a non-communication mode when not in use, to prevent power and peak power issues that may be unique to link budget limited devices. In response to poor non-cellular performance in support of a voice call, the UE may transition the cellular radio from the non-communication state to an online state. If the cellular network indicates that packet-switched calls are supported, then the UE may initiate handover of the voice call to the cellular network. Various methods for seamless handoff of data communications are also disclosed, in both the presence and the absence of a voice call. Various metrics are disclosed to enhance handoff determinations.

17 Claims, 9 Drawing Sheets

(56) References Cited

U.S. PATENT DOCUMENTS

| | | | |
|---|---|---|---|
| 2010/0165857 A1* | 7/2010 | Meylan | H04L 43/00 |
| | | | 370/252 |
| 2016/0234749 A1* | 8/2016 | Singh | H04W 36/0022 |
| 2017/0318502 A1* | 11/2017 | Singh | H04W 76/10 |
| 2017/0347278 A1* | 11/2017 | Gonzalez | H04B 1/385 |
| 2019/0116540 A1* | 4/2019 | Faus Gregori | H04W 36/0038 |

* cited by examiner

METHOD AND SYSTEM TO SUPPORT SEAMLESS WI-FI TO CELLULAR HANDOFF ON POWER CONSTRAINED DEVICE

TECHNICAL FIELD

The present application relates to wireless communication, including to techniques for managing handover between a WLAN network, such as a Wi-Fi network, and a cellular network for a user equipment device.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. In general, it would be desirable to reduce the power requirements of communication devices and improve user experience. Therefore, improvements in the field are desired.

SUMMARY

Embodiments are presented herein of, inter alia, systems, apparatuses, and methods for dynamic radio access technology (RAT) selection for a link budget limited user equipment device (UE).

A method for performing a voice call handover for a user equipment device (UE) is described. In some scenarios, the UE may be a link-budget limited device. The UE may determine that one or more performance characteristics of a connection with the non-cellular network has dropped below a specified performance threshold, wherein the connection is supporting a voice communication. In response to the determining, the UE may transition a cellular radio of the UE from a non-communication state to an online state. The UE may receive from the cellular network, via the cellular radio in the online state, an indication that the cellular network is configured to support packet-switched voice calls. The UE may then perform handover of the voice communication from the non-cellular network to the cellular network at least partly in response to receiving the indication.

In some scenarios, transitioning the cellular radio to the online state may include registering with the cellular network.

In some scenarios, the UE may perform non-voice data communications via a non-cellular radio of the UE concurrently with the voice communication, wherein non-voice data communications performed between the determining that one or more performance characteristics of a connection with the non-cellular network has dropped below a specified performance threshold and the performing handover of the voice communication from the non-cellular network to the cellular network continue to be performed via the non-cellular radio. In response to completing the handover of the voice communication from the non-cellular network to the cellular network, the UE may perform subsequent non-voice data communications via the cellular radio.

In some such scenarios, the UE may terminate a connection between the non-cellular radio and the non-cellular network in response to completing the handover of the voice communication from the non-cellular network to the cellular network.

In some scenarios, the UE may establish a connection with the cellular network, wherein the performing the handover of the voice communication from the non-cellular network to the cellular network may be further in response to determining that one or more performance characteristics of the connection with the cellular network indicate sufficient connection quality to support a voice communication.

In some scenarios, the one or more performance characteristics of the connection with the non-cellular network may include an indication of connection quality of a backhaul link of the non-cellular network.

Apparatuses are also disclosed for implementing these and other methods.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
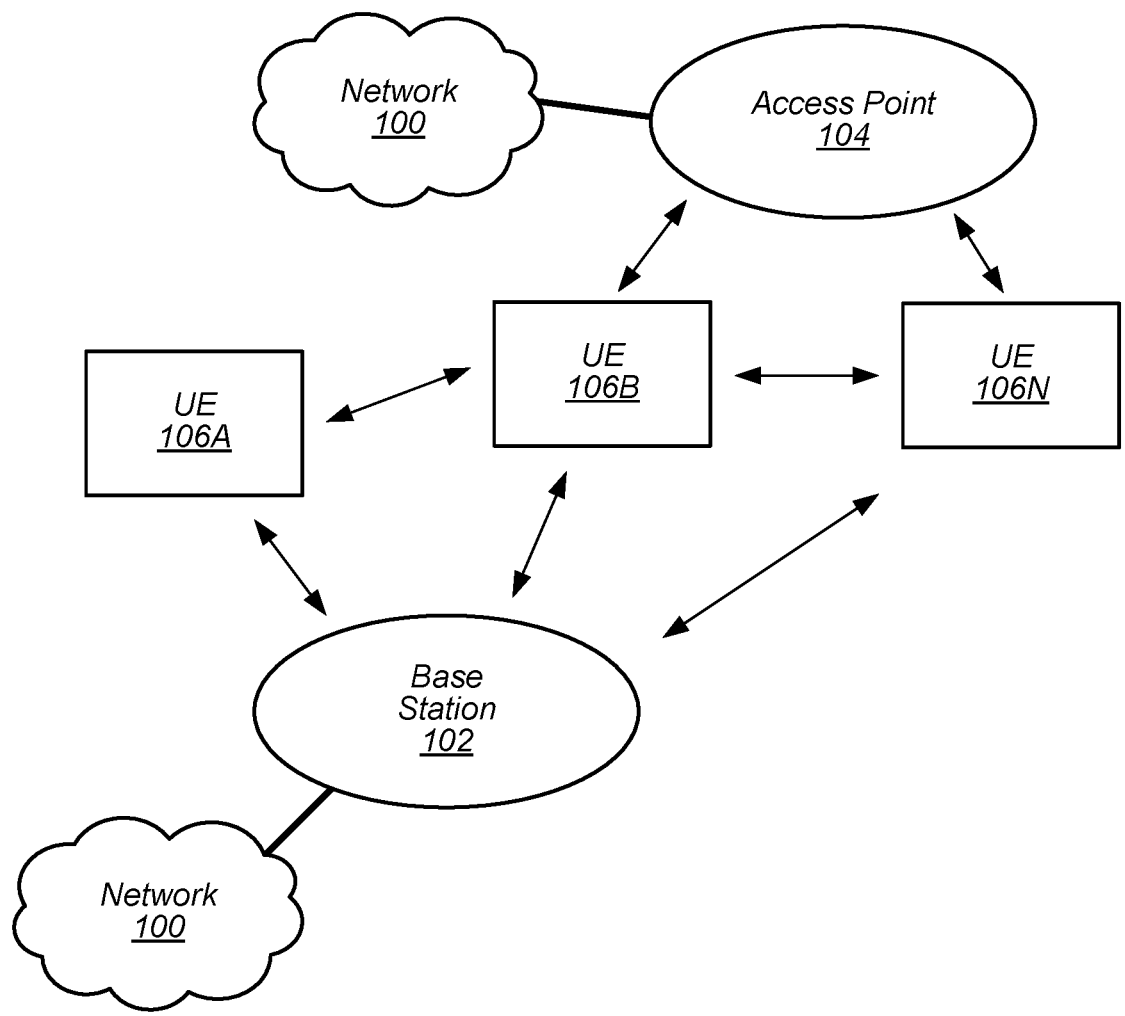
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB" or "gNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
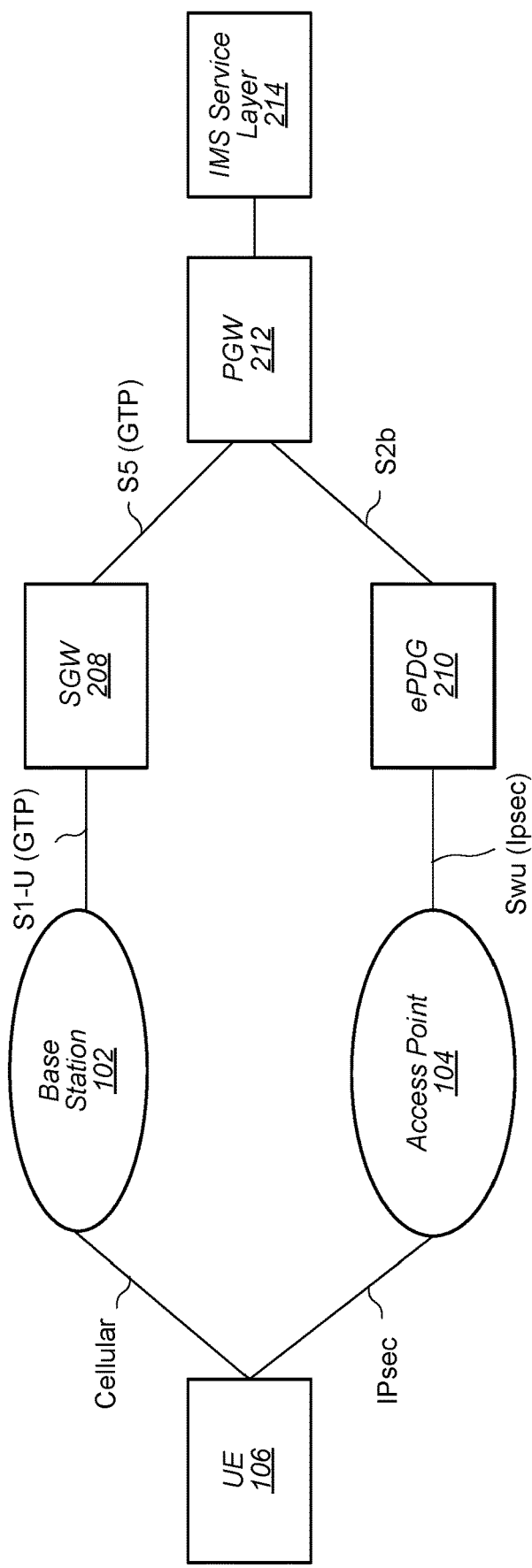
FIG. 2 illustrates an example user equipment in communication with a cellular base station and/or a non-cellular access point, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, through 106N. Wireless devices 106A-N may be user devices, which may be referred to herein as "user equipment" (UE) or UE devices. One or more of wireless devices 106A-N may be link budget limited devices.

The base station 102 may be a base transceiver station (BTS) or cell site, and may include hardware that enables wireless communication with the UE devices 106A-N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and/or between the UE devices 106 and the network 100. In other implementations, base station 102 may be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106A-N may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a geographic area via one or more cellular communication technologies.

Note that at least in some instances a UE device 106 may be capable of communicating using any of a plurality of wireless communication technologies. For example, a UE device 106 might be configured to communicate using one or more of GSM, UMTS, CDMA2000, LTE, LTE-A, NR, WLAN (e.g., Wi-Fi), Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106 may be configured to communicate using only a single wireless communication technology.

As shown, the exemplary wireless communication system also includes a Wi-Fi access point 104, which communicates over a transmission medium with the wireless device 106B and 106N. The Wi-Fi Access point also provides communicative connectivity to the network 100. Thus, according to some embodiments, wireless devices may be able to connect to either or both of the base station 102 (or another cellular base station) and the access point 104 (or another access point) to access the network 100 at a given time.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. The UE 106B may also be configured to communicate with the UE 106N.

The UE 106N may be a link budget limited device, such as a wearable device that has a smaller form factor, and may have limited battery, output power and/or communications abilities relative to UEs 106A-B. The limitation on communication abilities of the UE 106N may be permanent, e.g., due to limitations in output power or the radio access technologies (RATs) supported, or temporary, e.g., due to conditions such as current battery status, inability to access a network, or poor reception. The UE 106 N may communicate directly with one or more of the base station 102 and/or the access point 104.

In some scenarios, the UE 106N may also be capable of communicating with another device (e.g., UE 106B); for example, the UE 106N may according to some scenarios be "paired" with the UE 106B. In such scenarios, the UE 106B may be referred to as a proxy device, intermediate device, or companion device, and the UE 106N may be referred to as an accessory device. As one common example, the UE 106B may be a smart phone carried by a user, and the UE 106N may be a smart watch worn by that same user. The UE 106B and the UE 106N may communicate using any of various short-range communication protocols, such as Bluetooth or Wi-Fi. Under some circumstances, the UE 106N may use the cellular functionality of this proxy device for communicating voice/data with the base station 102 and/or access point 104. In other words, the UE 106N may provide voice/data packets intended for the base station 102 or access point 104 over the short-range link to the UE 106B, and the UE 106B may use its cellular or Wi-Fi functionality to transmit (or relay) this voice/data to the base station/access point on behalf of the UE 106N. Similarly, the voice/data packets transmitted by the base station/access point and intended for the UE 106N may be received by the cellular/Wi-Fi functionality of the UE 106B and then may be relayed over the short-range link to the UE 106N.

Alternatively, or additionally, the UE 106N may operate, either temporarily or permanently, without any connection or pairing to the UE 106B or other UE. When the UE 106N is configured to directly communicate with the base station (e.g., without being relayed by the UE 106B), the accessory device may be said to be in "autonomous mode" or "stand-alone mode".

FIG. 2 illustrates an example UE 106 in communication with base station 102 and/or access point 104, according to some embodiments. The UE 106 may be a link budget limited device (e.g., a smart watch), such as UE 106N. The UE 106 may have cellular communication capability and be capable of directly communicating with the base station 102, as shown. The UE 106 may also have Wi-Fi (or other WLAN) communication capability and be capable of directly communicating with the access point 104, as shown.

At least in some instances, the UE 106 may selectively utilize one or the other of cellular or Wi-Fi communication capability to communicate directly with a cellular base station or a Wi-Fi access point, e.g., even if both options may be available. For example, if both wireless link options are available and are capable of providing the communication services currently desired by the UE 106, the UE 106 might prioritize the Wi-Fi link, e.g., to potentially reduce device power consumption and/or if the Wi-Fi link is considered to have a lower economic cost. In other scenarios, the UE 106 might prioritize the cellular link. As described further subsequently herein, the UE 106 may manage the wireless connectivity in accordance with any of a variety of additional or alternative considerations at various times.

As shown, the UE 106 may communicate with the core service network via either the base station 102, using cellular communications, or the access point 104, using Wi-Fi communications. For example, the UE 106 may establish an IP Security (IPsec) tunnel with an evolved packet data gateway (ePDG) 210 via the access point 104, e.g., using a Wi-Fi radio. As shown, the access point 104 may support the tunnel to the ePDG 210 using the SWu interface, as defined by 3GPP TS 23.402 Version 15.3.0 ("TS 23.402"), or other interface. The ePDG 210 may communicate with a packet data network (PDN) gateway (PGW) 212, e.g, using the S2b interface, as defined by TS 23.402, or other interface. The PGW 212 may communicate with the IP multimedia subsystem (IMS) service layer 214.

Alternatively, the UE 106 may communicate with the base station 102, e.g., using a cellular radio. The base station 102 may communicate with a serving gateway (SGW) 208, e.g., via the S1-U interface, as defined by 3GPP TS 23.401 Version 15.3.0 ("TS 23.401"). In some scenarios, this may include establishing a tunnel, e.g., based on GPRS tunneling protocol (GTP). The SGW 208 communicate with the PGW 212, e.g., via the S5 interface, as defined by TS 23.401. In these scenarios, too, the PGW 212 may communicate with the IMS service layer 214.

The UE 106 may include a device or integrated circuit for facilitating cellular communication, referred to as a cellular modem or cellular radio. The cellular radio may include one or more processors (processor elements) and various hardware components as described herein. The UE 106 may similarly include a device or integrated circuit for facilitating WLAN communication, such as Wi-Fi communication, referred to as a non-cellular modem, non-cellular radio, WLAN radio, Wi-Fi radio, etc. The non-cellular radio may include one or more processors (processor elements) and various hardware components as described herein. The UE 106 may perform any of the method embodiments described herein by executing instructions on one or more programmable processors included in the cellular radio, included in the non-cellular radio, or included elsewhere in the UE 106. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular radio and the non-cellular radio described herein may be used in a UE device as defined herein, a wireless device as defined herein, or a communication device as defined herein.

The UE 106 may include one or more antennas for communicating using two or more wireless communication protocols or radio access technologies.

Figure 3:
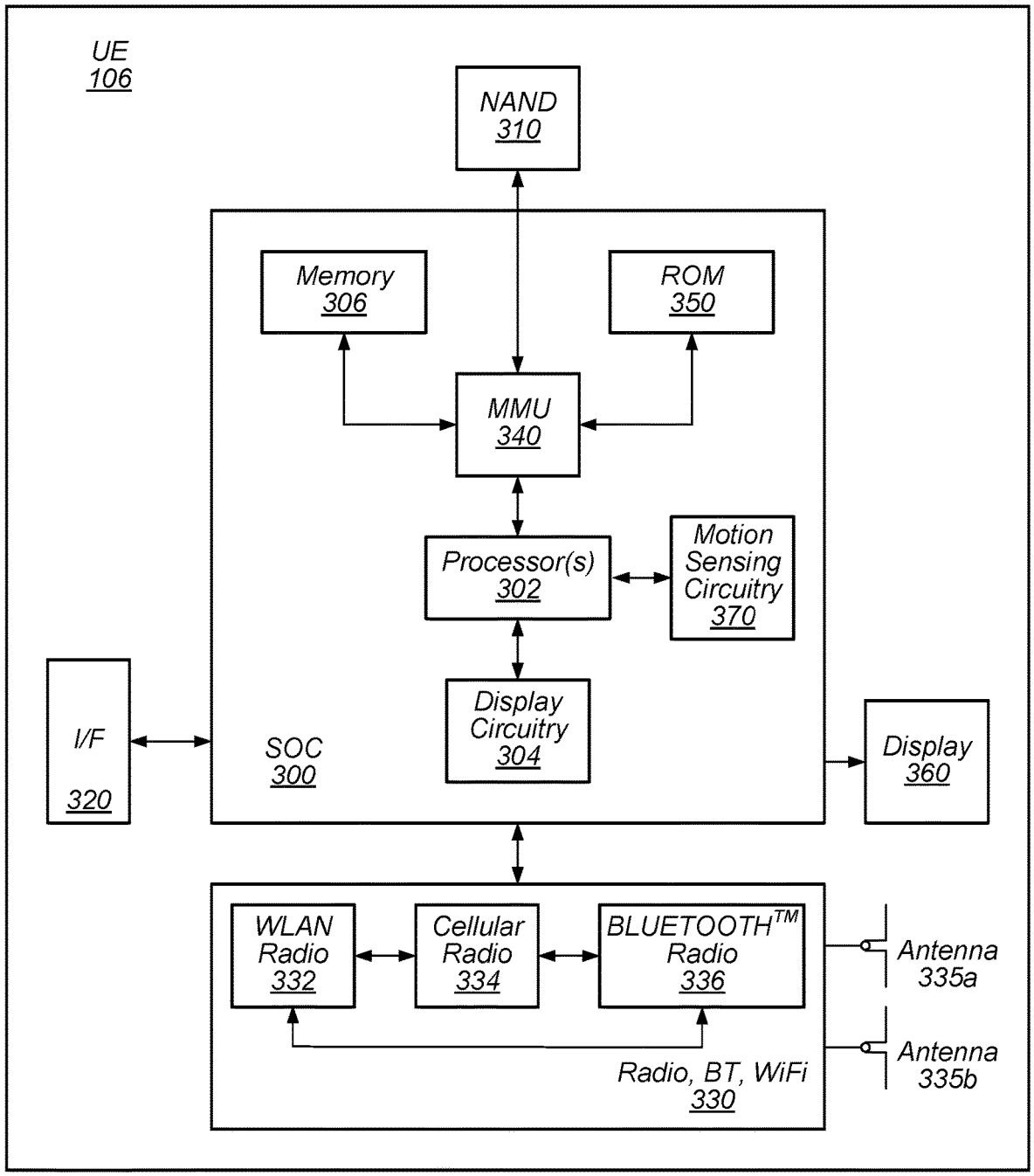
FIG. 3 is a block diagram illustrating an example wireless device, according to some embodiments.

FIG. 3—Example Block Diagram of a UE Device

FIG. 3 illustrates one possible block diagram of a UE device, such as UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory such as NAND 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface ("I/F") 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106 may include at least one antenna, and in some embodiments multiple antennas 335a and 335b, for performing wireless communication with base stations and/or other devices. For example, the UE device 106 may use antennas 335a and 335b to perform the wireless communication. As noted above, the UE device 106 may in some embodiments be configured to communicate wirelessly using a plurality of wireless communication standards or radio access technologies (RATs).

The wireless communication circuitry 330 may include a WLAN (e.g., Wi-Fi) radio 332, a cellular radio 334, and a Bluetooth™ radio 336. The WLAN radio 332 is for enabling the UE device 106 to perform WLAN communications, such as on an 802.11 network or other WLAN network. The Bluetooth™ radio 336 is for enabling the UE device 106 to perform Bluetooth™ communications. The cellular radio 334 may be a lower power cellular radio capable of performing cellular communication according to one or more cellular communication technologies.

As described herein, UE 106 may include hardware and software components for implementing embodiments of this disclosure. For example, one or more components of the wireless communication circuitry 330 (e.g., WLAN radio 332, cellular radio 334, Bluetooth™ radio 336) and/or other portions of the UE device 106, such as the processor 302, may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
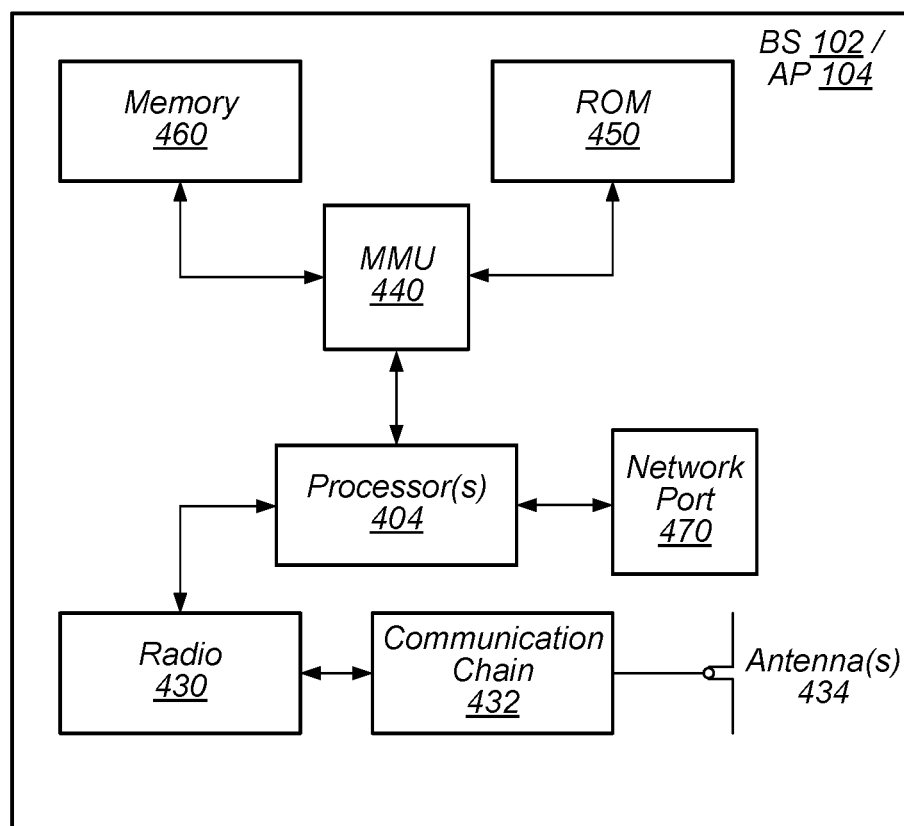
FIG. 4 is a block diagram illustrating an example base station and access point, according to some embodiments.

FIG. 4—Block Diagram of a Base Station

FIG. 4 illustrates an example block diagram of a base station 102 or access point 104, according to some embodiments. It is noted that the base station of FIG. 4 is merely one example of a possible base station. As shown, the base station 102/access point 104 may include processor(s) 404 which may execute program instructions for the base station 102/access point 104. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102/access point 104 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102/access point 104 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102/access point 104 may be configured to communicate wirelessly using multiple wireless communication standards. In some instances, the base station 102 may include multiple radios, which may enable the base station 102 to communicate according to multiple wireless communication technologies. For example, as one possibility, the base station 102/access point 104 may include an LTE radio for performing communication according to LTE as well as a Wi-Fi radio for performing communication according to Wi-Fi. In such a case, the base station 102/access point 104 may be capable of operating as both an LTE base station and a Wi-Fi access point. As another possibility, the base station 102/access point 104 may include a multi-mode radio which is capable of performing communications according to any of multiple wireless communication technologies (e.g., LTE and Wi-Fi, LTE and UMTS, LTE and CDMA2000, UMTS and GSM, etc.). As still another possibility, the base station 102/access point 104 may be configured to act exclusively as a Wi-Fi access point, e.g., without cellular communication capability.

As described further subsequently herein, the BS 102/AP 104 may include hardware and software components for implementing or supporting implementation of features described herein. The processor 404 of the base station 102/access point 104 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102/AP 104, in conjunction with one or more of the other components 430, 432, 434, 440, 450, 460, 470 may be configured to implement or support implementation of part or all of the features described herein.

Figure 5:
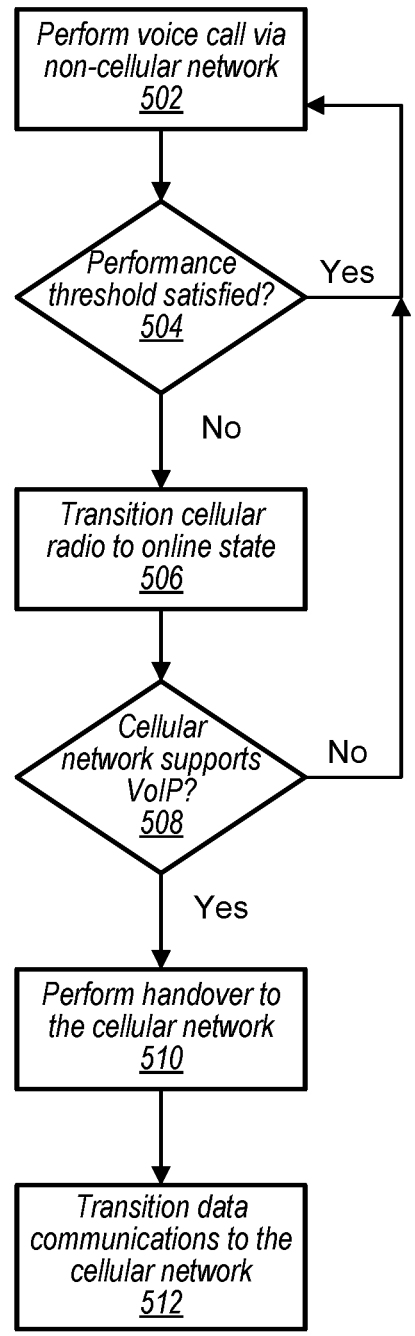
FIG. 5 shows a flow chart diagram illustrating a method for performing handover of a voice call from a non-cellular network to a cellular network by a wireless communication device, according to some embodiments.
Figure 6:
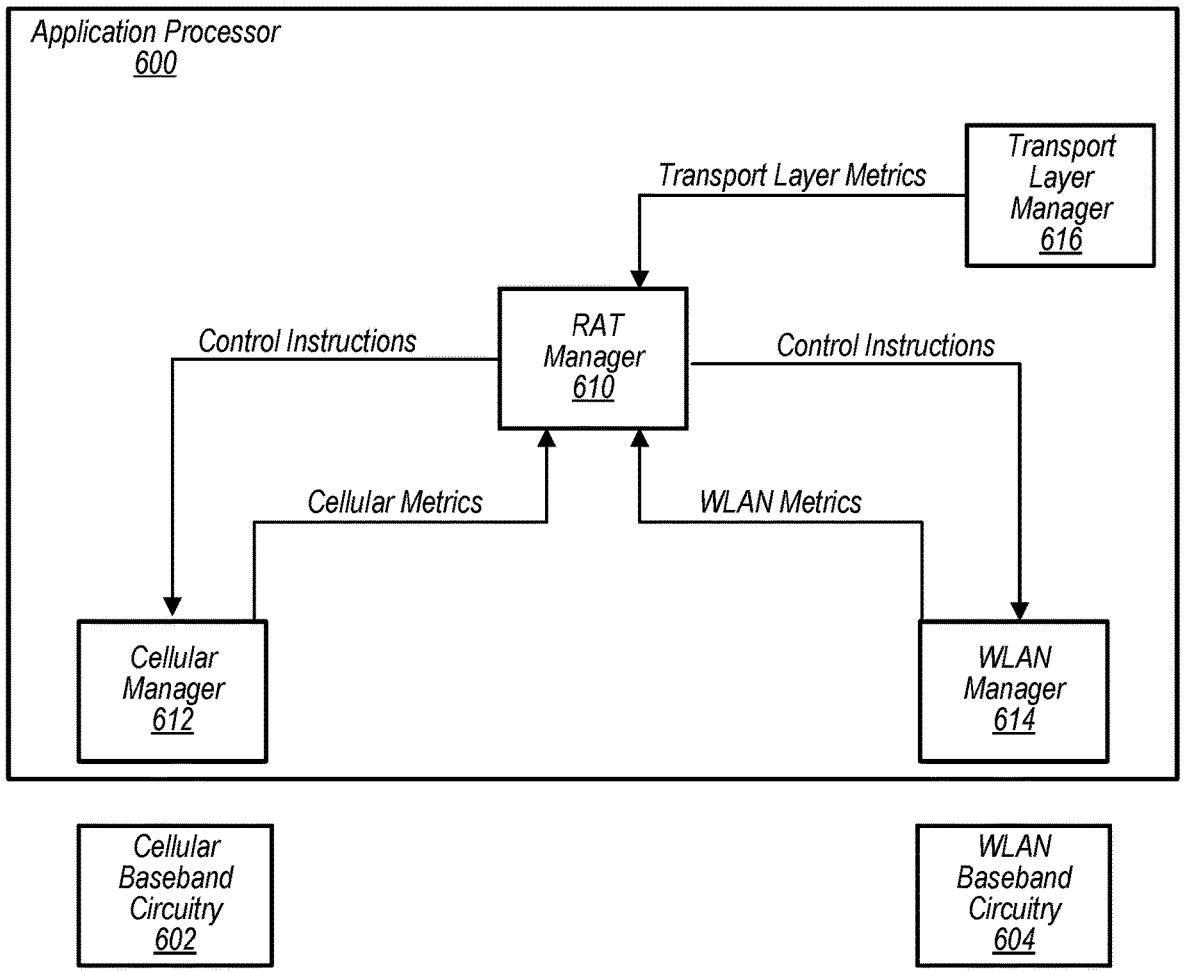
FIG. 6 illustrates an application processor of a user equipment, for use in implementing the method of FIG. 5, according to some embodiments.

FIGS. 5-6—Voice Call Handover for Link Budget Limited Device

Some wireless communication devices, such as the UE 106, may have a small form factor, or other constraints, which may cause them to be link budget limited. For example, a wearable device, such as a smart watch, may have reduced space for batteries, antennas, etc., relative to a traditional UE device, such as a smart phone or tablet computer. This may mean that the UE 106 may be limited, relative to a traditional UE device, in total battery power, peak power, transmit power, antenna gain, etc. To address these limitations, the UE 106 may be configured to prevent, reduce, or minimize simultaneous operation of a cellular radio and a non-cellular radio, such as a Wi-Fi (or other WLAN) radio.

Traditionally, a UE device typically maintains both a cellular radio and a Wi-Fi radio in online states, meaning that each radio is powered on and connected to a respective network, so as to allow uplink and/or downlink communications. This allows the traditional UE to communicate on either or both of the networks, or to perform handover from one network to the other, based on various factors such as relative signal quality, bandwidth, power requirements, data transmission cost, etc. However, keeping both radios in an online state consumes significant power, even if one or more of the radios is in a low-power state. For example, a cellular radio may enter a low-power state such as a discontinuous reception (DRX) mode or idle mode. However, the radio would still be required to periodically exchange messages with the network, in order to remain registered with the network and to receive paging signals and other traffic. Thus, the radio still consumes significant power. Such power consumption may be unacceptable in certain power-constrained devices. Thus, some present power-constrained devices may not support handover between Wi-Fi and cellular.

FIG. 5 shows a flow chart diagram illustrating a method for performing handover of a voice call from a non-cellular network (such as a Wi-Fi network) to a cellular network by a wireless communication device, according to some embodiments. Specifically, the method shown may be performed by a link budget limited device, such as the UE 106.

As illustrated in FIG. 5, the UE 106 may, at 502, perform a voice call via a non-cellular network. For example, the UE 106 may use a non-cellular radio, such as the WLAN radio 332, to establish a non-cellular communication session with the IMS service layer 214 via the access point 104, the ePDG 210, and the PGW 212, as illustrated in FIG. 2. The non-cellular communication session may support the voice call. In some scenarios, the non-cellular communication session may also support additional communications, such as non-voice data communications.

While the UE 106 is performing the voice call via the non-cellular network, the UE 106 may maintain a cellular radio, such as the cellular radio 334, in a non-communication state. For example, in some scenarios, the non-communication state may be a powered-off state. However, in some scenarios, government regulations or other constraints may dictate that the cellular radio remain in a powered-on state during voice calls, e.g., so as to be capable of receiving emergency broadcast messages, which might not be communicated via the non-cellular network. Therefore, in some scenarios, the non-communication state may include, e.g., a commercial mobile alert system (CMAS) mode or other emergency alert mode. In CMAS mode, the UE may not be registered with the cellular network, and may thus forego signal exchanges for the purpose of maintaining a connection or registration or monitoring paging signals. However, the UE may still receive emergency broadcast messages, which are not directed or addressed specifically to the UE, e.g., by monitoring less frequent sync messages. More generally, the non-communication state may include any state in which the UE 106 is not registered or actively connected to the cellular network. In such a state, the cellular radio may utilize relatively little power. The non-communication state may not include a DRX, sleep, or idle mode, which may require regular message exchange with the network to remain registered or connected. In short, while in the non-communication mode, the cellular radio is not registered with or connected to the cellular network.

The UE 106 may, at 504, determine whether a performance threshold is satisfied for the non-cellular communication session and/or the supported voice call. For example, the UE 106 may determine that one or more performance characteristics of the connection with the non-cellular network has dropped below a specified performance threshold.

If the performance threshold is satisfied, then the UE 106 may continue to perform the voice call via the non-cellular network. If the performance threshold is not satisfied (e.g., if one or more performance characteristics has dropped below a specified performance threshold), then at 506 the UE 106 may, in response, transition the cellular radio from the non-communication state to an online state. Transitioning the cellular radio to an online state may include registering with the cellular network. For example, the UE 106 may use the cellular radio to establish a cellular communication session with the IMS service layer 214 via the base station 102, the SGW 208, and the PGW 212, as illustrated in FIG. 2. In some scenarios, this may include activating, waking, or powering on portions of the cellular radio, such as cellular baseband circuitry.

The UE 106 may, at 508, determine whether the cellular network supports voice over IP (VoIP) calls. In some scenarios, this may occur during or after the process or registering with the cellular network. For example, the UE 106 may receive from the cellular network (e.g., via the cellular radio) an indication that the cellular network is configured to support packet-switched voice calls. For example, the UE 106 may receive from the network an IMS preferences message including such an indication. As a further example, the UE 106 may determine whether the connection quality of the cellular connection is sufficient to support a voice call.

In some scenarios, the UE 106 may determine whether the cellular network supports VoIP calls prior to transitioning the cellular radio to the online state. In such scenarios, step 506 may be omitted. For example, the UE 106 may have some limited contact with the cellular network while in the non-communication state, e.g., if the UE 106 is in CMAS mode. In such scenarios, the UE 106 may be able to determine a serving cell type of the base station 102 while in the non-communication state. If the UE 106 determines, e.g., that the serving cell is a non-LTE legacy cell, then the UE 106 may conclude that VoIP calls are not supported.

If the UE 106 determines at 508 that the cellular network does not support VoIP calls (e.g., if the cellular network supports only circuit switched voice calls or if the cellular connection quality is insufficient to support a voice call), then the UE 106 does not perform a handover of the voice call to the cellular network, and the UE 106 may instead continue to perform the voice call via the non-cellular network. In some such scenarios, the UE 106 may cause the cellular radio to search for additional cellular networks that may support VoIP calls. Alternatively, the UE 106 may transition the cellular radio back to the non-communication state.

If the UE 106 determines at 508 that the cellular network does support VoIP calls, then at 510 the UE 106 may, in response, perform handover of the voice call from the non-cellular network to the cellular network. For example, the UE 106 may trigger a PDN activation procedure to establish one or more bearers to the PGW 212 via the base station 102 and the SGW 208 to support the voice call. The UE 106 may further close the non-cellular connection that previously supported the voice call, e.g., by tearing down the IPsec tunnel to the ePDG 210.

As noted above, in some scenarios, the non-cellular communication session may also support additional communications, such as non-voice data communications. In such scenarios, the UE 106 may, at 512, transition the non-voice data communications to the cellular network in response to completion of handover of the voice call, such that subsequent data communications are performed via the cellular network. By waiting until handover has succeeded before transitioning the non-voice data communications to the cellular network, the UE 106 may avoid triggering peak power mitigation over the non-cellular network as a result of data activity via the cellular radio while the voice call is still supported by the non-cellular radio. For example, peak power constraints may limit the amount of dime during which the cellular radio and the non-cellular radio may transmit simultaneously. For example, a peak power budget may dictate that, if the cellular radio is actively broadcasting during a window of time, then a Wi-Fi radio may broadcast for no more than 5% of that time. In such scenarios, the non-cellular radio may have insufficient budget to transmit all available non-cellular packets, which may result in dropped packets. Thus, allowing the non-voice data communications to transition to the cellular network prior to completion of the handover might result in impairment of the voice call on the non-cellular network.

According to some embodiments, the UE 106 may designate either the cellular radio or the non-cellular radio as a primary interface, and may designate the other radio as a secondary interface. Typically, any non-voice data communications may be communicated via the primary interface. Traditionally, if the non-cellular radio is designated as the primary interface, such that non-voice data communications are performed via the non-cellular network, then a UE would, in response to determining that the non-cellular connection has deteriorated (e.g., deteriorated sufficiently to trigger a handover), reverse the designations, such that the non-cellular radio is re-designated as the secondary interface, while the cellular radio is designated as the primary interface. Thus, non-voice data communications would be likely to transition to the cellular network once performance of the non-cellular connection dropped below a certain level, such as below the performance threshold of 504.

However, according to the present scenario, the UE 106 does not change the interface designations or otherwise transition the non-voice data communications to the cellular network prior to handover of the voice call, despite any performance metrics of the non-cellular connection and/or of the cellular connection. Specifically, transmission of non-voice data communications via the cellular network prior to or during handover of the voice call may result in poor user experience by interfering with the voice call supported by the non-cellular connection, wherein the voice call is already experiencing poor performance on the non-cellular connection, as indicated by the failure of the non-cellular communication session to meet the performance threshold at 504. Thus, any non-voice data communication performed between the determining, at 504, that the performance threshold is not satisfied and performing, at 510, handover of the voice communication from the non-cellular network to the cellular network continues to be performed via the non-cellular network, using the non-cellular radio. The UE 106 may, at 512, re-designate the cellular radio as the primary interface and the non-cellular radio as the secondary interface in response to completion of handover of the voice call.

According to some embodiments, the non-cellular radio may not be powered off when not in use. Instead, the non-cellular radio may be designated as the secondary interface, and any previously established tunnels or other connections with the non-cellular network may be terminated. In this way, the non-cellular radio may be maintained in a state that may be quickly reactivated, whereas powering the non-cellular radio on may take considerably longer.

The one or more performance characteristics considered at 504 may include any combination of various metrics, such as physical layer (PHY) quality indicators (such as RSSI and/or SNR), automatic repeat request (ARQ) quality indicators (such as TX aborts), beacon quality indicators (such as beacon packet error rate (PER)), bandwidth quality indicators, and/or uplink quality indicators (such as TX PER or QBSS). In some scenarios, the performance threshold may be identical to a threshold traditionally defined for triggering handover, e.g., from Wi-Fi to cellular. In other scenarios, the performance threshold of 504 may be slightly higher than a threshold traditionally defined for triggering handover— e.g., at such a level that handover is determined to be imminent, but not yet triggered. In this way, the UE 106 may, in some scenarios, have additional time to transition the cellular radio to the online state before the non-cellular connection performance deteriorates so far as to trigger a handover. Thus, the UE 106 may perform the handover quickly once the non-cellular connection does further deteriorate, despite having maintained the cellular radio in the non-communication state until just prior to the time handover is requested. As specific examples, the performance threshold of 504 may include one or more of the following: RSSI falling below −85 dBm, SNR falling below 5 dB, or TX PER exceeding 20%.

In some scenarios, the UE 106 may, following 512, subsequently determine to perform handover from the cellular network back to the non-cellular network, e.g., because one or more performance thresholds of the cellular network has deteriorated and/or one or more performance thresholds of the non-cellular network has improved. In response to such a determination, the UE 106 may establish a communication session via the non-cellular network and perform handover of the voice call from the cellular network to the non-cellular network. The UE 106 may then transition the cellular radio back to the non-communication state.

It should be appreciated that the method shown in FIG. 5 is merely an example, and various adaptations may be appropriate. For example, various steps may be omitted and other steps may be added within the scope of this disclosure. For example, 512 may not occur in all scenarios, e.g., when non-voice data communications are not being performed. As a further example, in some scenarios, the method may include a further preliminary step of determining whether the UE 106 is operating in a standalone mode, wherein the some or all of the steps illustrated in FIG. 5 are performed in response to determining that the UE 106 is operating in the standalone mode.

FIG. 6 illustrates an application processor 600 of the UE 106, for use in implementing the method of FIG. 5, according to some embodiments. For example, the application processor 600 may be included in the processor(s) 302. A radio access technology (RAT) manager 610 may be a software application executing on the application processor 600 or may be a separate processor, among various possibilities. The RAT manager 610 may provide control instructions to a cellular manager 612 and/or a WLAN manager 614 based at least in part on information (e.g., connection metrics) received from these and/or other components, e.g., according to some embodiments.

The WLAN manager 614 may provide WLAN metrics to the RAT manager 610, based on information from WLAN baseband circuitry 604. Additionally, the WLAN manager 614 may manage the state of the WLAN baseband circuitry 604, e.g., based on control instructions received from the RAT manager 610. According to some embodiments, the WLAN baseband circuitry may be included in the WLAN radio 332. Similarly, the cellular manager 612 may provide cellular metrics to the RAT manager 610, based on information from cellular baseband circuitry 602. Additionally, the cellular manager 612 may manage the state of the cellular baseband circuitry 602, e.g., based on control instructions received from the RAT manager 610. According to some embodiments, the cellular baseband circuitry may be included in the cellular radio 334. A transport layer manager 616 may provide transport layer metrics, such as real-time transport protocol (RTP) metrics.

According to some embodiments, the UE 106 may utilize the application processor 600 in performing various steps of the method illustrated in FIG. 5. For example, the RAT manager 610 may receive performance metrics, such as those discussed above, from the cellular manager 612, the WLAN manager 614, and/or the transport layer manager 616, and may perform the determinations at 504 and/or 508, based on those received metrics. Additionally, the RAT manager 610 may, at 506, provide control instructions to the cellular manager 612 to cause the cellular baseband circuitry 602 to transition to the online state. Similarly, the RAT manager 610 may, e.g., at 510 and/or 512, provide control instructions to the cellular manager 612 and the WLAN manager 614 to cause the cellular baseband circuitry 602 and the WLAN baseband circuitry 604 to perform the handover from the non-cellular network to the cellular network and/or to transition non-voice data communications to the cellular network.

Figure 7:
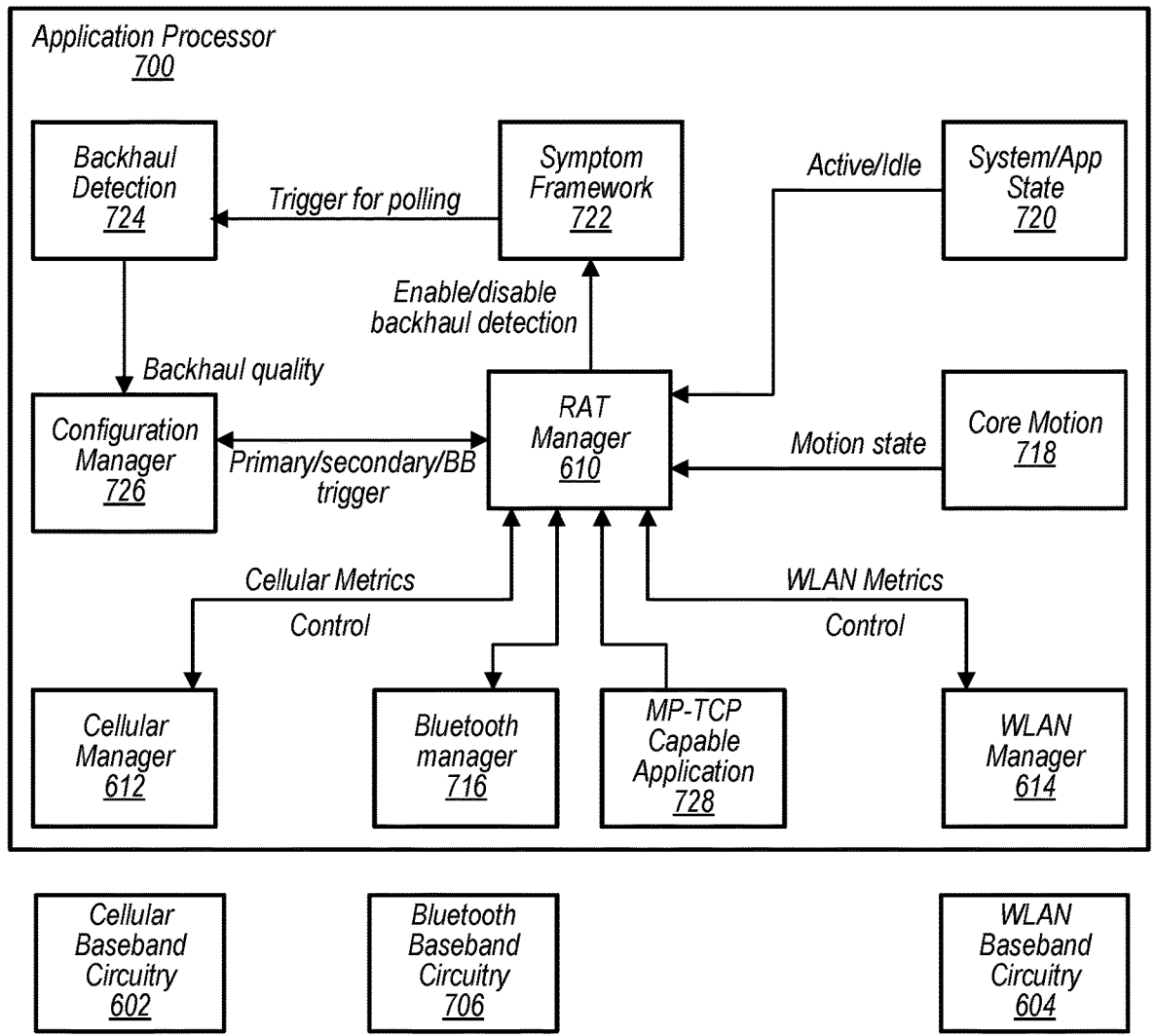
FIG. 7 illustrates an application processor of a user equipment for performing enhanced selection of radio access technologies, according to some embodiments.
Figure 8:
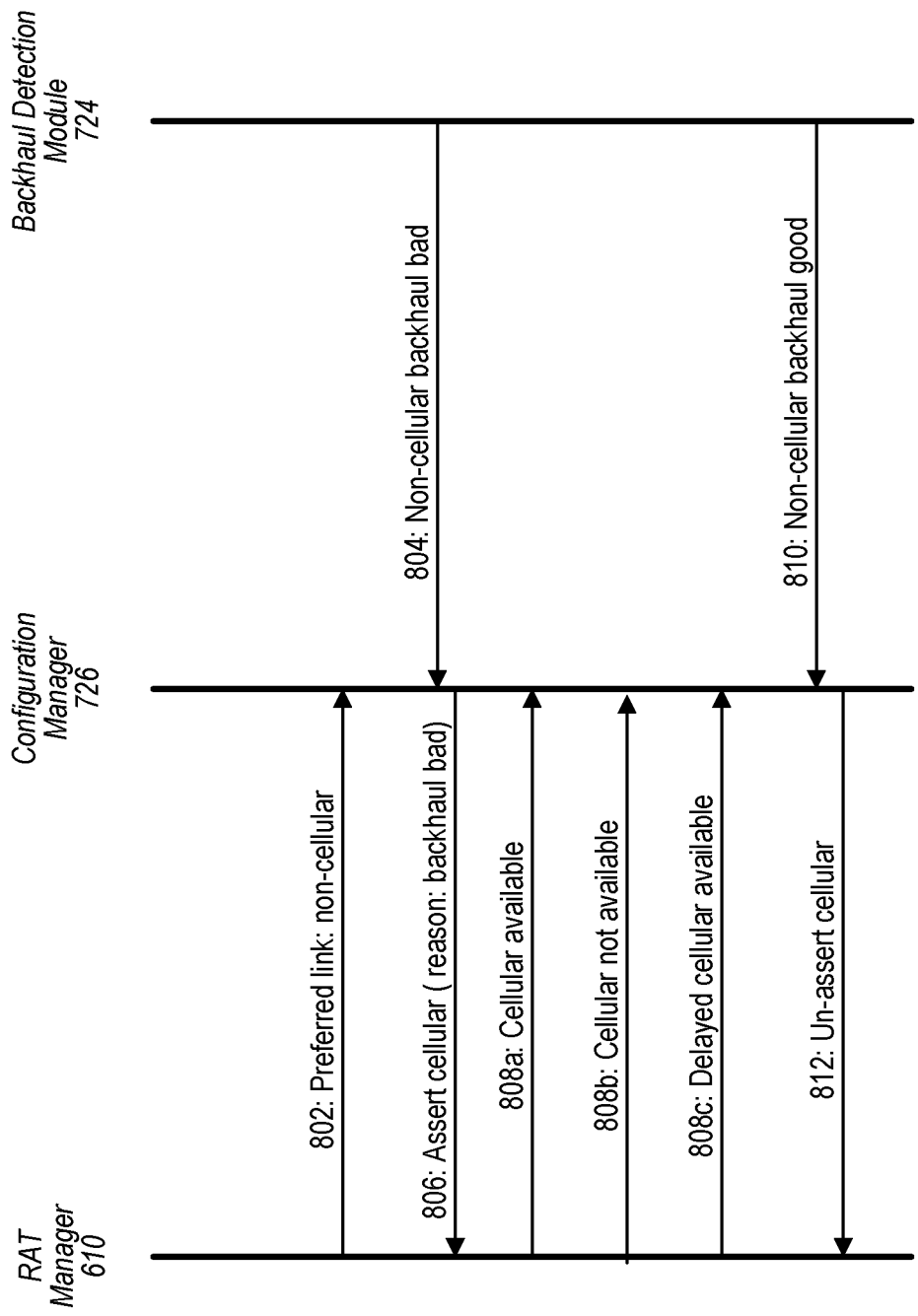
FIG. 8 illustrates example signal flow between modules within the application processor of FIG. 7, for selection of a primary interface, according to some embodiments.
Figure 9:
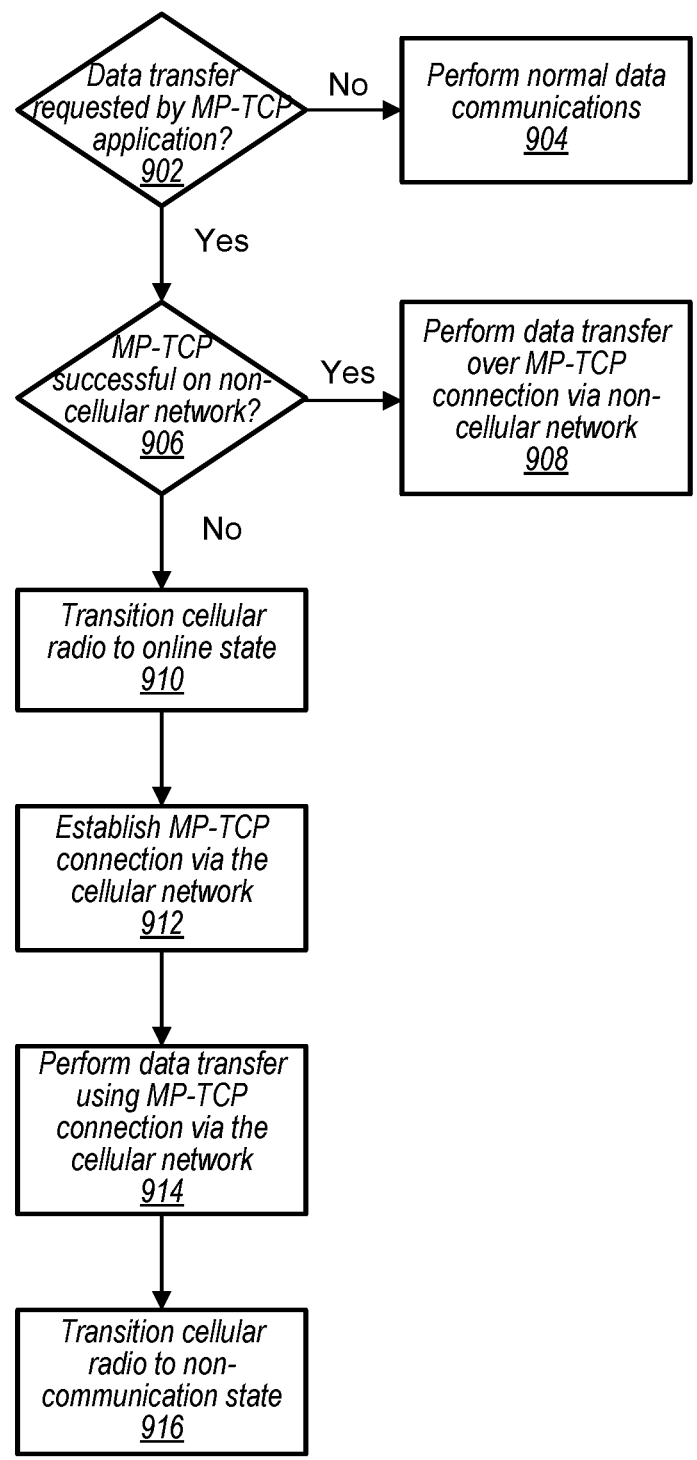
FIG. 9 shows a flow chart diagram illustrating a method for performing data transfer for a MP-TCP-capable application according to some embodiments.

FIGS. 7-9—Enhanced Procedures for RAT Selection for Link Budget Limited Device FIG. 7 illustrates an application processor 700 of the UE 106, according to some embodiments. For example, the application processor 600 may be included in the processor(s) 302. In some scenarios, the application processor 700 may include the same modules, and may perform the same functions as the application processor 600. In some scenarios, the application processor 700 may further include additional modules, enabling additional functions, e.g., as follows. The additional modules and functions may, in some scenarios be included in the application processor 600.

The cellular baseband circuitry 602, the cellular manager 612, the WLAN baseband circuitry 604, and the WLAN manager 614 may be substantially as described with regard to FIG. 6. RAT manager 610, may be substantially as described with regard to FIG. 6, and may further communicate with the additional modules illustrated in FIG. 7. The RAT manager 610 may use various information received from the additional modules, e.g., in making improved RAT selection decisions, for providing control instructions to the cellular manager 612 and/or the WLAN manager 614.

For example, the RAT manager 610 may provide to a symptom framework module 722 an instruction to enable/disable backhaul detection. Backhaul detection may allow the UE 106 to determine when a backhaul connection of a network (e.g., the non-cellular network) is not functioning properly, which information may be used by the RAT manager 610 in deciding to transition communication traffic to a different RAT (e.g., the cellular network).

Because backhaul detection consumes additional power, this function may, according to some embodiments, be disabled in scenarios when transitioning to a different RAT is not possible or feasible. For example, in some scenarios, transitioning from the non-cellular network to the cellular network may not be allowed when the UE 106 is not operating in standalone mode. Therefore, backhaul detection may be disabled when the UE 106 is not in standalone mode; e.g., the RAT manager 610 may provide to the symptom framework module 722 an instruction to enable backhaul detection at least partly in response to the UE 106 entering standalone mode and/or an instruction to disable backhaul detection at least partly in response to the UE 106 leaving standalone mode. As another example, in some scenarios, transitioning from the non-cellular network to the cellular network if the UE 106 does not have a valid eSIM, or if cellular communication is in some other way impaired or disabled. Backhaul detection may be disabled in such scenarios.

When backhaul detection is enabled, the symptom framework module 722 may periodically provide a polling trigger to a backhaul detection module 724. In response to receiving the polling trigger, the backhaul detection module 724 may ping a remote server, e.g., through the primary interface. The backhaul detection module 724 may report the results (e.g., a failure rate for a plurality of pings) to a configuration manager 726. The configuration manager 726 may inform the RAT manager 610 of the status of the backhaul link, e.g., periodically or upon a change of the status. The configuration manager 726 may also be responsible for designating the primary and secondary interfaces, based on input from the RAT manager 610. The RAT manager 610 may consider the backhaul quality as an additional metric in making handover decisions or in designating a primary interface. The benefit of such backhaul reporting is illustrated in FIG. 8.

FIG. 8 illustrates example signal flow between the RAT manager 610, the configuration manager 726, and the backhaul detection module 724 for selection of a primary interface, according to some embodiments.

As shown, the RAT manager 610 may communicate to the configuration manager 726 a preferred link, e.g., based on input from other modules of the application processor 700. For example, the RAT manager 610 may indicate to the configuration manager 726, at 802, that the non-cellular radio is the preferred link. In response, the configuration manager 726 may designate the non-cellular radio as the primary interface.

At some later time, the backhaul detection module 724 may indicate to the configuration manager 726, at 804, that the backhaul connection of the non-cellular network is not functioning, or is performing below a minimum specified performance threshold. For example, the indication of 804 may report that the backhaul detection module 724 cannot contact a known remote server. In response, the configuration manager 726 may inform the RAT manager 610, at 806, of the non-performance of the backhaul, and/or may assert a request that the RAT manager 610 activate the cellular radio. This data may be valuable to the RAT manager 610 when selecting a preferred link, e.g., because the connection metrics reported by the WLAN manager 614 may indicate a strong connection between the UE 106 and the AP 104, but a communication session via the non-cellular network may nevertheless be unusable due to failure of the backhaul.

In response to receiving the indication at 806, the RAT manager 610 may determine whether to assert the cellular radio as the preferred link. For example, the RAT manager 610 may determine whether one or more criteria are met. For example, in some scenarios, the RAT manager 610 may assert the cellular radio as the preferred link in response to determining that the UE 106 is operating in standalone mode, that the non-cellular radio is not currently conducting a voice call, and that the cellular network is available and meets one or more specified connection quality thresholds. In some scenarios, this may involve transitioning the cellular radio from the non-communication state to the online state.

In response to determining that the one or more criteria are met, the RAT manager 610 may communicate to the configuration manager 726, at 808a, that the cellular radio is available and/or is the preferred link. The configuration manager 726 may respond by designating the cellular radio as the primary interface.

Alternatively, in response to determining that the one or more criteria are not met, the RAT manager 610 may communicate to the configuration manager 726, at 808b, that the cellular radio is not available. Therefore, the configuration manager 726 may maintain the non-cellular radio as the primary interface. However, in some scenarios, the RAT manager 610 may later determine that the criteria have become satisfied, and may then communicate, at 808c, that the cellular radio is available and/or is the preferred link. The configuration manager 726 may then respond by designating the cellular radio as the primary interface.

At some later time, the backhaul detection module 724 may indicate to the configuration manager 726, at 810, that the backhaul connection of the non-cellular network is functioning at least at a minimum specified performance threshold. In response, the configuration manager 726 may inform the RAT manager 610, at 812, of the performance of the backhaul, and/or may un-assert its request that the RAT manager 610 activate the cellular radio. In response, the RAT manager 610 may communicate to the configuration manager 726 that the non-cellular radio is the preferred link and/or may cause the cellular radio to transition from the online state to the non-communication state.

Returning now to FIG. 7, as another example of additional modules and features, the RAT manager 610 may receive, from a core motion module 718, information regarding a motion state of the UE 106, such as whether the UE 106 is stationary, moving at pedestrian speeds, or moving at driving speeds. The RAT manager 610 may use this information in making RAT selection decisions. For example, the RAT manager 610 may cause the configuration manager 726 to designate the cellular radio as the primary interface at least partly in response to determining that the UE 106 is moving rapidly, e.g., because WLAN communications typically have relatively short signal range.

As another example, a system/app state module 720 may provide information regarding whether the system and/or one or more applications are in an active or idle state. For example, according to some embodiments, an application may be considered to be idle if it is not transferring data, or if the data being transferred is non-time-sensitive, such as background data. In such scenarios, the application may tolerate connection interruptions and low data transfer rates. Thus, the RAT manager 610 may seek to save power by maintaining the non-cellular radio as the primary interface, even if the non-cellular connection quality is poor. For example, the RAT manager 610 may set a very low performance threshold for maintaining the non-cellular radio as the primary interface.

By contrast, according to some embodiments, an application may be considered to be active if it is transferring high-bandwidth and/or time-sensitive data. For example, a music streaming application may be considered to be active if it is currently streaming music. In such scenarios, the RAT manager 610 may determine that the user experience will be poor if the data is frequently or substantially delayed or interrupted, e.g., due to poor connection quality on the primary interface. Thus, the RAT manager 610 may set a higher performance threshold to maintain the non-cellular radio as the primary interface. Therefore, the RAT manager 610 may more frequently cause the cellular radio to transition to the online state and be designated as the primary interface. In some scenarios, once the active data transfer is complete, the RAT manager may cause the configuration manager 726 to re-designate the non-cellular radio as the primary interface, and may cause the cellular radio to transition back to the non-communication state.

As another example, the Bluetooth manager 716 may provide information such as Bluetooth metrics and Bluetooth state information to the RAT manager 610, based on information from Bluetooth baseband circuitry 706. For example, the Bluetooth manager 716 may report to the RAT manager 610 whether the Bluetooth baseband circuitry is currently supporting an active communication session, e.g., with a Bluetooth headset. Additionally, the Bluetooth manager 716 may manage the state of the Bluetooth baseband circuitry 706, e.g., based on control instructions received from the RAT manager 610. According to some embodiments, the Bluetooth baseband circuitry 706 may be included in the Bluetooth radio 336.

In some scenarios, if the RAT manager 610 determines that a voice call is active via the cellular network and that the voice call is supported by a Bluetooth headset connected to the Bluetooth radio 336, then the RAT manager 610 may prevent the non-cellular radio (e.g., including the WLAN baseband circuitry 604) from auto-joining a non-cellular network. Specifically, auto-joining a non-cellular network typically involves searching for available access points and exchanging various control signals, any of which may interfere with the ongoing voice call being supported by both the cellular radio and the Bluetooth radio, thus leading to poor user experience. More generally, this example may not be limited to use of a Bluetooth headset, but may similarly apply to any other real-time Bluetooth accessory device, such as a health-monitoring device, a gaming input device, etc.

In other scenarios, the RAT manager 610 may allow the non-cellular radio to auto-join a non-cellular network under such conditions, but only in response to the RAT manager 610 determining that handover of the voice call to a non-cellular network may be possible. For example, the RAT manager 610 may determine that the cellular voice call is a packet-switched voice call, for which handover to a non-cellular network may be possible. Specifically, in such circumstances, the call quality may sometimes be improved by handover to a non-cellular network. Therefore, a temporary disruption in call quality due to signaling involved in the auto-join process may be tolerated in order to achieve long-term improvement due to handover following successful auto-join. However, if the RAT manager 610 determines that handover to a non-cellular network is not possible, e.g., because the cellular voice call is a circuit-switched call or because W-Fi calling is not allowed by the service provider, then the RAT manager 610 may prevent the non-cellular radio from auto-joining the non-cellular network, because no improvement in quality of the voice call can be achieved through handover to the non-cellular network. Therefore, performing an auto-join procedure would risk disruption to the voice call without any corresponding gain.

As another example, a multi-path transmission control protocol (MP-TCP)-capable application 728 may communicate status information to the RAT manager 610. For example, the MP-TCP-capable application 728 may inform the RAT manager 610 of failed communication attempts. The benefit of such failure reporting is illustrated in FIG. 9.

FIG. 9 shows a flow chart diagram illustrating a method for performing data transfer for a MP-TCP-capable application according to some embodiments. Specifically, the method shown may be performed by a link budget limited device, such as the UE 106.

The UE 106 may, at 902, determine whether a data transfer is requested by the MP-TCP-capable application 728. In response to determining that the data transfer was not requested by the MP-TCP-capable application 728 (e.g., was requested by a non-MP-TCP-capable application), the UE 106 may, at 904, perform the data transfer according to traditional procedures, or according to procedures outlined elsewhere herein.

In response to determining that the data transfer was requested by the MP-TCP-capable application 728, the UE 106 may, at 906, determine whether the data transfer may be performed successfully via the non-cellular network. For example, in some scenarios, the non-cellular radio may currently be designated as the primary interface. The UE 106 may therefore establish a MP-TCP connection via the non-cellular network, and successfully initiate the data transfer. In response to determining that the data transfer may be performed via the non-cellular network, the UE 106 may, at 908 perform the data transfer via the non-cellular network.

In some scenarios, the UE 106 may determine at 906 that the MP-TCP connection is not successful via non-cellular network. For example, the UE 106 may initially establish the MP-TCP connection, but may fail to transfer the data via the non-cellular network, e.g., because of poor connection performance. According to some embodiments, the MP-TCP-capable application 728 may report the failed transfer attempts to the RAT manager 610. In response, the UE 106 may, at 910, transition the cellular radio from the non-communication state to the online state. For example, the RAT manager 610 may send control instructions to the cellular manager 612 to cause the cellular baseband circuitry 602 to transition to the online state.

The UE 106 may, at 912, establish the MP-TCP connection via the cellular network. Specifically, MP-TCP allows a special TCP connection to be established with a remote server, but without binding the connection to a particular IP address. Thus, data may be addressed to different IP addresses without tearing down or reestablishing the MP-TCP connection. In some scenarios, the cellular network and the non-cellular network may utilize different IP addresses. However, by implementing a MP-TCP connection to the destination server, the UE 106 may dynamically transition between the different IP addresses, to perform the data transfer via the non-cellular network and/or the cellular network. Thus, establishing the MP-TCP connection via the cellular network at 912 may include merely redirecting the data via the cellular network, according to the MP-TCP connection previously established via the non-cellular network.

The UE 106 may, at 914, perform (e.g., complete) the data transfer using the MP-TCP connection via the cellular network. In response to determining that the data transfer is complete, the UE 106 may, at 916, transition the first radio to the non-communication state.

In some scenarios, the preceding method may be performed without designating the cellular radio as the primary interface. E.g., the non-cellular radio may be maintained as the primary interface throughout the method, even while data is transferred via the cellular network. Additionally, in some scenarios, the MP-TCP-capable application 728 may be unaware of the transition from using the non-cellular network to using the cellular network. The ability to transition dynamically between the cellular and the non-cellular networks, without a need to tear down and reestablish TCP connections, may provide savings in time and power.

It should be appreciated that the method shown in FIG. 9 is merely an example, and various adaptations may be appropriate. For example, various steps may be omitted and other steps may be added within the scope of this disclosure.

Specific Scenarios

The following paragraphs disclose specific scenarios that are intended to be encompassed by the present disclosure.

A wireless communication device may include: a first radio configured to communicate with a cellular network; a second radio configured to communicate with a non-cellular network; and a processor coupled to the first radio and the second radio. The processor may be configured to cause the wireless communication device to: determine that a data transfer is requested by a Multi-Path Transmission Control Protocol (MP-TCP)-capable application; determine, in response to determining that the data transfer is requested by a MP-TCP-capable application, that the data transfer is unsuccessful via the non-cellular network; transition the first radio, in response to determining that the data transfer is unsuccessful via the non-cellular network, from the non-communication state to an online state, wherein transitioning to the online state includes registering with the cellular network; establish a MP-TCP connection via the cellular network; perform the data transfer using the MP-TCP connection via the cellular network; and in response to determining that the data transfer is complete, transition the first radio to the non-communication state.

In some implementations of the preceding wireless communication device, the non-cellular radio may remain the primary interface while the data transfer is performed using the MP-TCP connection via the cellular network.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless communication device comprising:
   a first radio configured to communicate with a cellular network;
   a second radio configured to communicate with a non-cellular network; and
   a processor coupled to the first radio and the second radio, wherein the processor is configured to cause the wireless communication device to:
     determine that one or more performance characteristics of a connection with the non-cellular network has dropped below a specified performance threshold, wherein the connection is supporting a voice communication;
     perform non-voice data communications via the second radio concurrently with the voice communication;
     transition the first radio, in response to the determining, from a non-communication state to an online state;
     receive from the cellular network an indication that the cellular network is configured to support packet-switched voice calls;
     perform handover of the voice communication from the non-cellular network to the cellular network at least partly in response to receiving the indication; and
     in response to completing the handover of the voice communication from the non-cellular network to the cellular network, perform subsequent non-voice data communications via the first radio, wherein non-voice data communications performed between the determining that one or more performance characteristics of a connection with the non-cellular network has dropped below a specified performance threshold and the performing handover of the voice communication from the non-cellular network to the cellular network continue to be performed via the second radio.

2. The wireless communication device of claim 1, wherein the wireless communication device is a link-budget limited device.

3. The wireless communication device of claim 1, wherein transitioning to the online state comprises registering with the cellular network.

4. The wireless communication device of claim 1, wherein the processor is further configured to cause the wireless communication device to:
   terminate a connection between the second radio and the non-cellular network in response to completing the handover of the voice communication from the non-cellular network to the cellular network.

5. The wireless communication device of claim 1, wherein the processor is further configured to cause the wireless communication device to:
   establish a connection with the cellular network;
   wherein the performing the handover of the voice communication from the non-cellular network to the cellular network is further in response to determining that one or more performance characteristics of the connection with the cellular network indicate sufficient connection quality to support a voice communication.

6. An apparatus for use in a wireless communication device, the apparatus comprising:
   a memory storing software instructions; and
   a processor communicatively coupled to the memory and configured to execute the software instructions, wherein executing the software instructions causes the processor to:
     cause a non-cellular radio of the wireless communication device to establish a connection with a non-cellular network to support a voice call;
     cause the non-cellular radio to perform non-voice data communications concurrently with the voice call;
     determine that one or more performance characteristics of the connection with the non-cellular network has dropped below a specified performance threshold;
     cause a cellular radio of the wireless communication device to transition from a non-communication state to an online state, in response to the determining;
     receive, via the online cellular radio, an indication that the cellular network is configured to support packet-switched voice calls;
     perform handover of the voice call from the non-cellular network to the cellular network at least partly in response to receiving the indication; and
     in response to performing the handover of the voice communication from the non-cellular network to the cellular network, cause the cellular radio to perform subsequent non-voice data communications, wherein non-voice data communications performed between the determining that one or more performance characteristics of a connection with the non-cellular network has dropped below a specified performance threshold and the performing handover of the voice communication from the non-cellular network to the cellular network continue to be performed via the non-cellular radio.

7. The apparatus of claim 6, wherein the wireless communication device comprises a link-budget limited device.

8. The apparatus of claim 6, wherein the cellular radio transitioning to the online state comprises registering with the cellular network.

9. The apparatus of claim 6, wherein executing the software instructions further causes the processor to:
   cause the non-cellular radio to terminate the connection with the non-cellular network in response to completing the handover of the voice communication from the non-cellular network to the cellular network.

10. The apparatus of claim 6, wherein executing the software instructions further causes the processor to:
    cause the cellular radio to establish a connection with the cellular network;
    wherein the performing the handover of the voice call from the non-cellular network to the cellular network is further in response to determining that one or more performance characteristics of the connection with the cellular network indicate sufficient connection quality to support a voice call.

11. The apparatus of claim 6, wherein the one or more performance characteristics of the connection with the non-cellular network comprises an indication of connection quality of a backhaul link of the non-cellular network.

12. A method for performing a voice call handover for a user equipment device (UE), the method comprising:
by the UE:
determining that one or more performance characteristics of a connection with a non-cellular network has dropped below a specified performance threshold, wherein the connection is supporting a voice communication;
performing non-voice data communications via a non-cellular radio of the UE concurrently with the voice communication;
transitioning a cellular radio of the UE, in response to the determining, from a non-communication state to an online state;
receiving from a cellular network, via the cellular radio in the online state, an indication that the cellular network is configured to support packet-switched voice calls;
performing handover of the voice communication from the non-cellular network to the cellular network at least partly in response to receiving the indication; and
in response to completing the handover of the voice communication from the non-cellular network to the cellular network, performing subsequent non-voice data communications via the cellular radio, wherein non-voice data communications performed between the determining that one or more performance characteristics of a connection with the non-cellular network has dropped below a specified performance threshold and the performing handover of the voice communication from the non-cellular network to the cellular network continue to be performed via the non-cellular radio.

13. The method of claim 12, wherein the UE is a link-budget limited device.

14. The method of claim 12, wherein transitioning the cellular radio to the online state comprises registering with the cellular network.

15. The method of claim 12, further comprising:
terminating a connection between the non-cellular radio and the non-cellular network in response to completing the handover of the voice communication from the non-cellular network to the cellular network.

16. The method of claim 12, further comprising:
establishing a connection with the cellular network;
wherein the performing the handover of the voice communication from the non-cellular network to the cellular network is further in response to determining that one or more performance characteristics of the connection with the cellular network indicate sufficient connection quality to support a voice communication.

17. The method of claim 12, wherein the one or more performance characteristics of the connection with the non-cellular network comprises an indication of connection quality of a backhaul link of the non-cellular network.

* * * * *